(12) United States Patent
Monti et al.

(10) Patent No.: US 11,997,065 B1
(45) Date of Patent: May 28, 2024

(54) SYSTEM AND METHOD OF CLIENT-SIDE DNS PRIORITIZATION USING TIME ZONE OFFSET TO SELECT FROM CONFIGURED LIST OF DNS SERVERS

(71) Applicant: CHARTER COMMUNICATIONS OPERATING, LLC, St. Louis, MO (US)

(72) Inventors: Steven R. Monti, Lone Tree, CO (US); Jordan A. Dechaine, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/112,937

(22) Filed: Feb. 22, 2023

(51) Int. Cl.
*H04L 61/4511* (2022.01)
*H04L 67/52* (2022.01)
*H04L 67/561* (2022.01)

(52) U.S. Cl.
CPC .......... *H04L 61/4511* (2022.05); *H04L 67/52* (2022.05); *H04L 67/561* (2022.05)

(58) Field of Classification Search
CPC ..... H04L 61/4511; H04L 67/52; H04L 67/561
USPC ........................................................ 709/245
See application file for complete search history.

(56) References Cited

U.S. PATENT DOCUMENTS

| | | | | |
|---|---|---|---|---|
| 9,965,640 | B1* | 5/2018 | Blum | H04L 67/1085 |
| 11,023,378 | B2* | 6/2021 | Foxhoven | H04L 61/4552 |
| 11,290,485 | B2* | 3/2022 | Galliano | H04L 61/4511 |
| 2002/0010798 | A1* | 1/2002 | Ben-Shaul | H04L 67/52 |
| | | | | 707/E17.116 |
| 2004/0258056 | A1* | 12/2004 | Ishihara | H04L 61/4511 |
| | | | | 370/386 |
| 2006/0112176 | A1* | 5/2006 | Liu | H04L 67/101 |
| | | | | 709/245 |
| 2007/0158335 | A1* | 7/2007 | Mansbery | H05B 6/6435 |
| | | | | 219/505 |
| 2011/0010437 | A1* | 1/2011 | Christenson | H04L 41/0806 |
| | | | | 709/222 |
| 2011/0105151 | A1* | 5/2011 | Hall | A63F 13/216 |
| | | | | 455/456.3 |
| 2012/0023153 | A1* | 1/2012 | Karasaridis | H04L 67/52 |
| | | | | 709/203 |
| 2013/0208629 | A1* | 8/2013 | Luo | H04L 12/1485 |
| | | | | 370/259 |
| 2014/0207818 | A1* | 7/2014 | Jellick | H04L 45/02 |
| | | | | 707/771 |

(Continued)

OTHER PUBLICATIONS

Licht, et al., "Client ID in Forwarded DNS Queries draft-tale-dnsop-edns0-clientid-01", DNSOP Working Group, Internet-Draft, 10 pages, (Mar. 13, 2017).

*Primary Examiner* — Tauqir Hussain
(74) *Attorney, Agent, or Firm* — THE MARBURY LAW GROUP, PLLC

(57) ABSTRACT

Systems and network devices configured for client-side domain name system (DNS) prioritization using time zone offset to select from configured list of DNS servers. A UE device (DNS client) may determine its current time zone, and query a locally stored domain name system (DNS) server list to select a regional DNS server based on its current time zone. The UE device may send DNS requests for resource addresses to the selected regional DNS server. In response, the UE device may receive DNS response messages that priorities resource addresses based on their geographic proximity to the current time zone of the UE device.

20 Claims, 10 Drawing Sheets

(56) References Cited

U.S. PATENT DOCUMENTS

| | | | | |
|---|---|---|---|---|
| 2016/0080398 A1* | 3/2016 | Yablokov | ............ | H04L 63/1416 |
| | | | | 726/23 |
| 2018/0167298 A1* | 6/2018 | He | ...................... | H04L 61/4511 |
| 2018/0227977 A1* | 8/2018 | Jin | ........................ | H04W 8/065 |
| 2018/0270302 A1* | 9/2018 | Yang | .................... | H04L 67/1021 |
| 2018/0309712 A1* | 10/2018 | Jeong | ................... | H04L 61/3025 |
| 2019/0306110 A1* | 10/2019 | Davis | .................... | H04L 63/068 |
| 2020/0137093 A1* | 4/2020 | Janakiraman | ....... | H04L 63/0263 |
| 2020/0178198 A1* | 6/2020 | Ding | ..................... | H04W 60/04 |
| 2021/0067468 A1* | 3/2021 | Cidon | .................... | H04L 45/38 |
| 2021/0119960 A1* | 4/2021 | Sinha | ................... | H04L 61/5076 |
| 2021/0342426 A1* | 11/2021 | Pham | ................... | G06F 21/316 |
| 2022/0007064 A1* | 1/2022 | Okuyama | ........... | H04N 21/2343 |
| 2022/0191100 A1* | 6/2022 | Kim | ..................... | H04L 61/4511 |
| 2022/0272019 A1* | 8/2022 | Zhou | .................... | H04L 61/5007 |
| 2023/0015916 A1* | 1/2023 | Ryu | ..................... | H04L 43/0858 |
| 2023/0097763 A1* | 3/2023 | Pandiri | ................. | G06F 9/5077 |
| | | | | 718/1 |
| 2023/0239234 A1* | 7/2023 | Zohar | ................... | H04L 45/123 |
| | | | | 370/389 |

* cited by examiner

SYSTEM AND METHOD OF CLIENT-SIDE DNS PRIORITIZATION USING TIME ZONE OFFSET TO SELECT FROM CONFIGURED LIST OF DNS SERVERS

BACKGROUND

The Domain Name System (DNS) is a hierarchical and decentralized naming system for computers, services, or other resources connected to a communication network, such as the Internet. The DNS associates a variety of information with domain names assigned to each of the participating entities. The DNS translates more readily memorized domain names to unique numerical addresses, such as Internet Protocol (IP) addresses, for locating and identifying computer services and devices with the underlying network protocols.

Client computing devices attempting to locate a resource on a communication network may send a DNS query that includes a fully qualified domain name (FQDN) or a requested resource address (e.g., a uniform resource identifier (URI) or a uniform resource locator (URL)) to a DNS server. The DNS server may respond with a DNS response that includes a resource identifier (e.g., IP address) of the requested resource address. The client computing device may receive and use the information included in the DNS response to locate and access the requested resource address.

SUMMARY

Various aspects include methods of requesting resources in a communication network, which may include determining, by a processor in a user equipment (UE) device, a current time zone of the UE device, querying a domain name system (DNS) server list to select a regional DNS server based on the current time zone, sending a DNS request for a resource address to the selected regional DNS server, and receiving a DNS response message from the regional DNS server that prioritizes resource addresses based on their geographic proximity to the current time zone of the UE device.

In some aspects, determining the current time zone of the UE device may include dynamically receiving a time zone offset from the communication network. In some aspects, determining the current time zone of the UE device may include accessing a statically configured time zone value stored on the UE device. In some aspects, sending a DNS request for a resource address to the selected regional DNS server may include causing an authoritative DNS to provide regionally tailored responses to specific recursive DNS servers servicing clients in specific time zones.

Further aspects may include a computing device having a processor configured with processor-executable instructions to perform various operations corresponding to the methods discussed above.

Further aspects may include a computing device having various means for performing functions corresponding to the method operations discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1A:
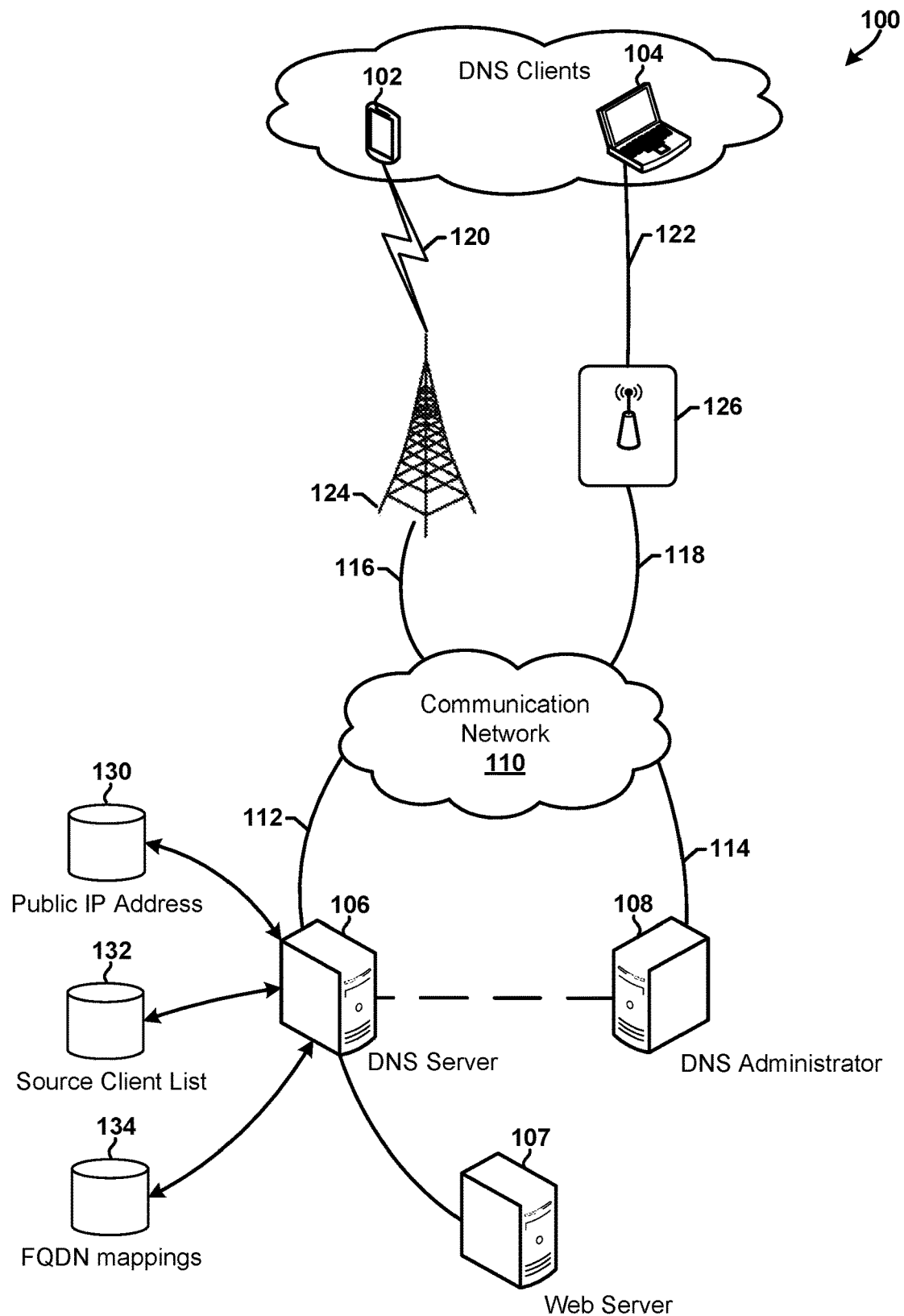
FIGS. 1A-1C are communication system block diagrams of an IP network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

In overview, the various embodiments include methods, and computing devices configured to implement the methods, for requesting resources in a communication network. A user equipment (UE) device may be configured to determine its current time zone, query a domain name system (DNS) server list to select a regional DNS server based on the current time zone, send a DNS request for a resource address to the selected regional DNS server, and receive a tailored DNS response obtained from the authoritative name server or a DNS response message from the regional DNS server that prioritizes resource addresses based on their geographic proximity to the current time zone of the UE device.

The term "service provider network" is used generically herein to refer to any network suitable for providing consumers with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The terms "user device" "endpoint" and "user equipment (UE)" may be used generically and interchangeably herein to refer to any one or all of satellite or cable set top boxes, laptop computers, rack mounted computers, routers, cellular telephones, smart phones, personal or mobile multi-media players, personal data assistants (PDAs), customer-premises equipment (CPE), tablet computers, smart books, palm-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The term "server" may be used herein to refer to any computing system capable of functioning as a server, such as a communications server, a nameserver, a master exchange server, a web server, a mail server, a document server, a database server, a route server, a content server, or any other type of server. A server may be a dedicated computing device or a computing device including a server module (e.g., running an application that causes the computing device to operate as a server).

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer-readable media having various instructions and/or data structures stored thereon. Components may communicate by way of local and/or remote processes, function or procedure calls, electronic signals, data packets, memory read/writes, and other known computer, processor, and/or process-related communication methodologies.

The dynamic host configuration protocol (DHCP) is a network management protocol used on Internet Protocol (IP) networks whereby a DHCP server dynamically assigns an IP address and other network configuration parameters to each UE device on the LAN so they may communicate with other Internet Protocol (IP) networks on the WAN. A DHCP server may allow UE devices to request IP addresses and networking parameters automatically from the service provider, thereby reducing the need for a network administrator or a user to manually assign the IP addresses to the UE devices. The DHCP server may also be configured to provide the UE device with time zone information (e.g., via option 42, etc.).

The Domain Name System (DNS) is a hierarchical and decentralized naming system for computers, services, or other resources connected to the Internet or a private network. The DNS may associate a variety of information with domain names assigned to each of the participating entities and may translate domain names to the numerical IP addresses for locating and identifying computer services and devices with the underlying network protocols.

A "managed network" may be an outsourced communication network that is developed, controlled, and/or managed by a service provider. Managed service providers (MSPs) may deliver services through the cloud or via in-house infrastructure. There is a wide range of managed network services and applications. For example, "hosted voice" is a service in which a business's telephone system and private branch exchange (PBX) reside off-site and are managed by a third-party, providing telephone connectivity via the Internet using Voice over Internet Protocol (VoIP). Other examples of managed network services include basic network access, virtual network services, transport services (e.g., leased WAN and LAN connections, etc.), network monitoring, security, virtualization, connectivity, and bandwidth services, etc.

Through DHCP mechanisms controlled by an MSP, UE devices may be directed to geographically optimized resources, ensuring that the devices use the closest and most efficient resources available. However, in instances in which UE devices are outside the MSP managed network, they may obtain IP connectivity from non-MSP managed networks and may be directed to use public DNS servers unless they are statically configured to utilize MSP's recursive DNS servers. While mechanisms exist to perform Extended DNS (EDNS), there are limitations and privacy concerns associated with EDNS. As a result, most existing solutions use public DNS servers that provide a global generic response of all IP information provided by the authoritative name server for a domain. As a result, the same IP information is provided to all users, regardless of their location or network.

As an example, using other solutions, a DNS client (a UE device) may still connect to the same DNS server even in instances in which the DNS client is moved outside of the managed network and from one geographic location to another, such as for example in instances in which a person travels from New York to California. The DNS server may translate domain names into IP addresses for network resources located on the east coast, even though the UE device is now physically located on the west coast. This may result in increased latency, congestion, or otherwise have a negative impact on the performance of the DNS client (e.g., because it is still communicating with network resources as if it were in its previous geographic location). For example, a DNS client in California may receive a response from a local web server in 10 milliseconds, but the same response from a distant web server in New York may take 20-30 milliseconds or more.

The various embodiments disclosed herein may overcome these and other technical challenges by deploying a network of local web servers and DNS servers and configuring the DNS client to perform client-side DNS prioritization operations. The DNS client may prioritize connecting to more geographically convenient (i.e., local) DNS servers, web servers, and/or resources. For example, the DNS client may determine or select a DNS server based on the detected DNS client's time zone, which may be configured by the end user and/or automatically detected using GPS and updated in real-time. As such, various embodiments may allow the endpoints (e.g., DNS client, etc.) to make determinations locally that will connect them to resources that are regionally optimal for them. By making such determinations locally on the DNS client, various embodiments may allow for the selection and use of regionally optimal resources without the limitations and privacy concerns associated with EDNS and/or without taxing or otherwise negatively impacting internal core systems that are supporting the endpoints (as may be the case if the resource selection operations were performed in the network and/or by the DNS server). For these and other reasons, the various embodiments may reduce latency and improve the performance, efficiency, functionality, and/or responsiveness of UE devices and/or managed service networks.

Various embodiments disclosed herein may allow the decision regarding the optimal communication path to take place with the DNS client. The DNS client, configured with a list of regional DNS servers, may choose to prioritize the DNS server list based on the DNS client's current time zone offset. The DNS server may present a tailored response obtained from the authoritative name server or send a statically configured response to any DNS client reaching that regional DNS server. As the DNS client changes networks (due to travel from one geographic area to another), the DNS client may reevaluate its time zone offset and choose from the list of regional DNS servers, based on the value of the time zone offset. The DNS servers in each region may be configured to provide resources optimal to devices in that region. This may ensure that UE devices in remote networks not managed by a provider may reach the most suitable resources.

Various embodiments disclosed herein may also minimize the number of fully qualified domain names (FQDNs) that are to be maintained and defined in the configuration of the UE device or the application. In addition, the various embodiments may allow for the use of a single configuration element (e.g., voiceServer.com) rather than multiple within each subsection of that UE device's configuration (e.g., voiceServerEast.com, voiceServerCentral.com and voiceServerWest.com, etc.). For these additional reasons, the various embodiments may improve the performance, efficiency, and/or functionality of a managed service network, its constituent components, and/or UE devices.

Figure 1B:
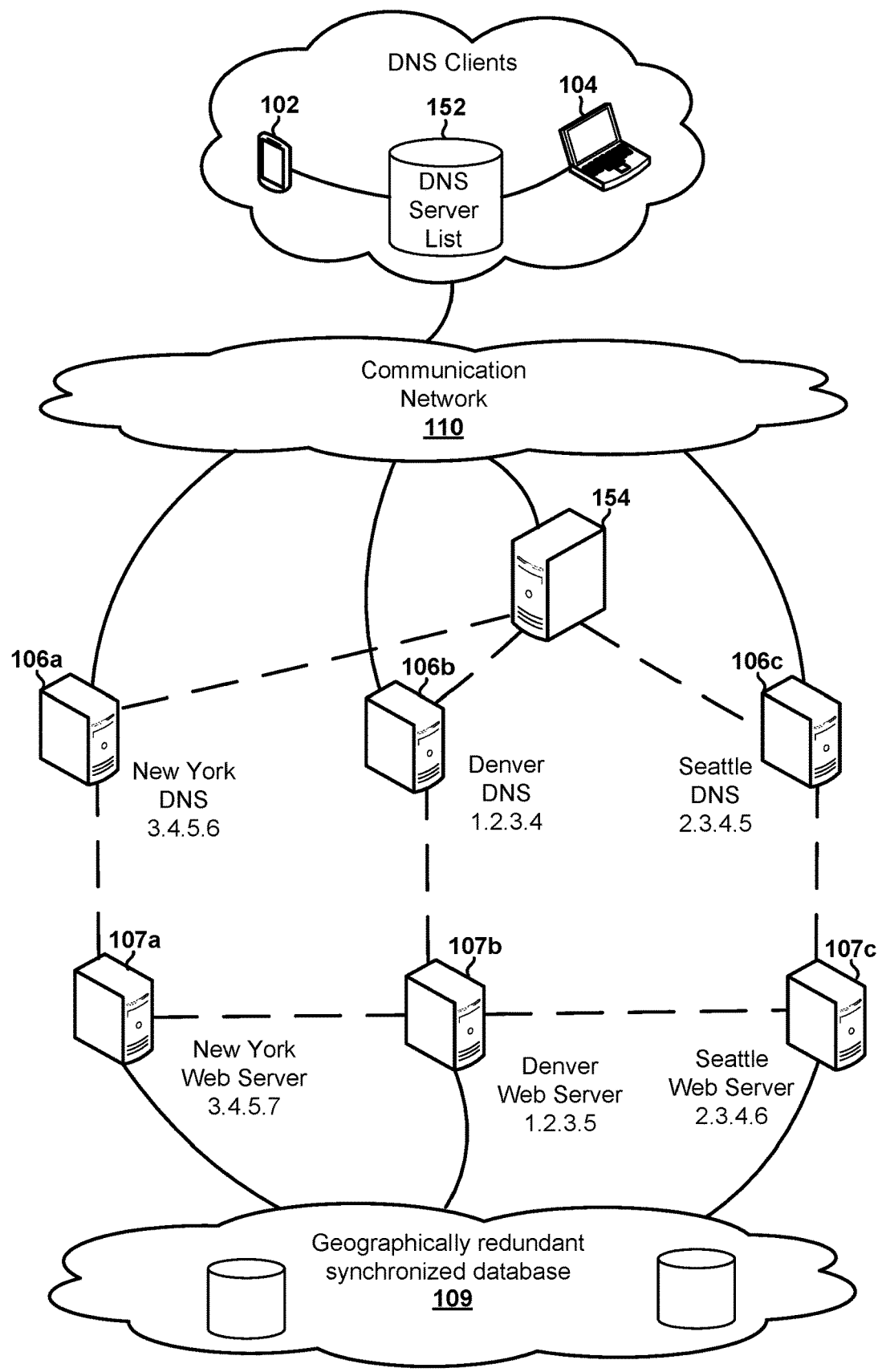
Figure 1C:
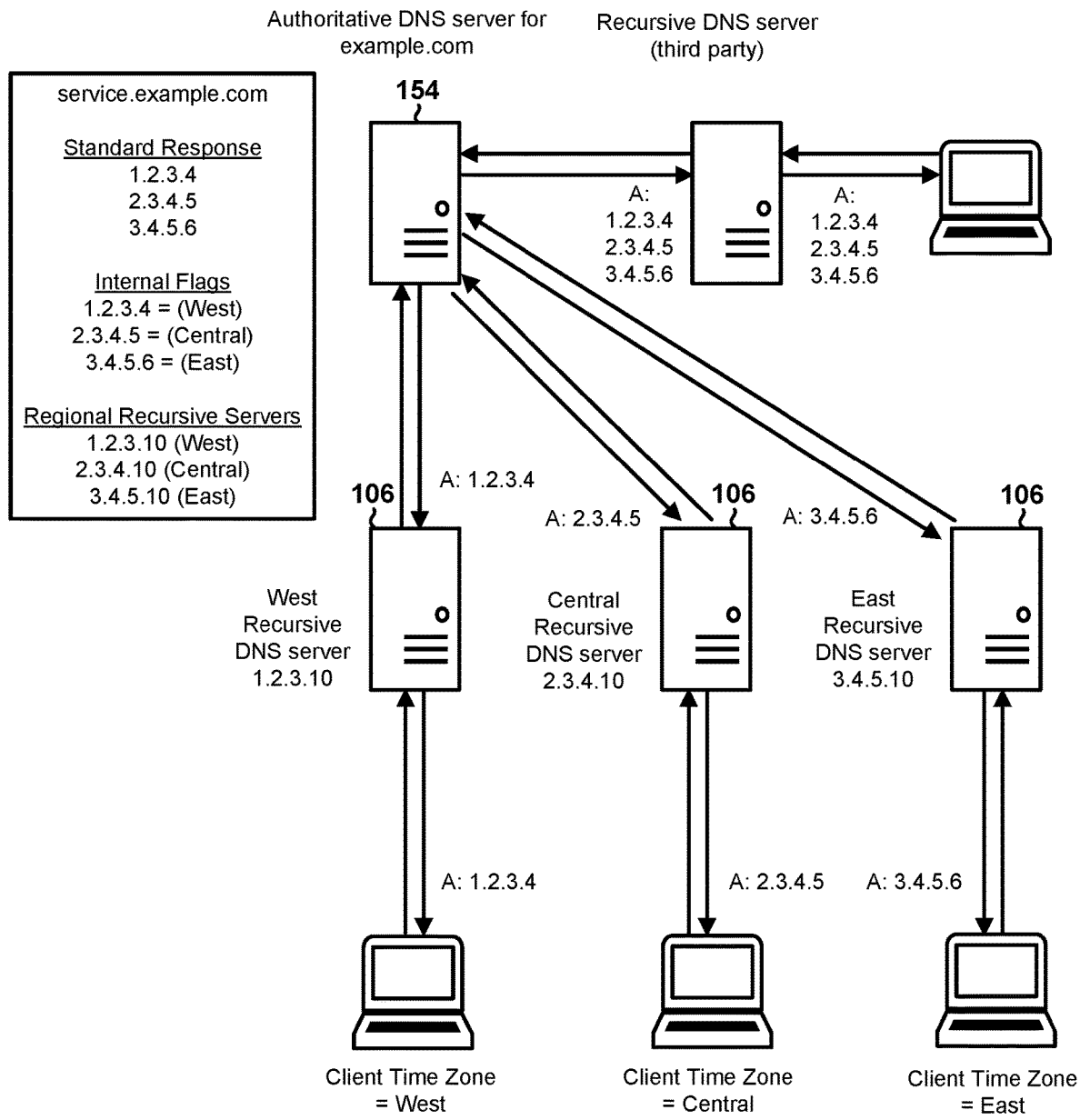

FIGS. 1A-1C are simplified examples of communication systems 100 that may be used to implement a managed network service in accordance with some embodiments. In the example illustrated in FIG. 1A, the communication system 100 may include a UE device 102, a personal computer 104, a DNS server 106, a web server 107, and a DNS administrator 108 that may be coupled directly or indirectly to the communication network 110 via wired or wireless communication links 112-122, base stations 124 and/or customer premise equipment (CPE) 126. The DNS server 106 may include or have access to various databases, such as the illustrated public IP address datastore 130, the source client list datastore 132, and the fully qualified domain name (FQDN) mappings datastore 134.

The CPE 126 device may include a cable modem, digital subscriber line modem, router, switch, firewall, packet filter, wireless access point, and/or a residential gateway that provides network connectivity to a home or small office network. In particular, the CPE 126 device may allow UE devices (e.g., UE device 102) on the local area network (LAN) to connect to a wide area network (WAN) and ultimately the Internet.

The DNS administrator 108 may be configured to perform DNS administration and/or DNS update functions. For example, the DNS administrator 108 may update or modify DNS information such as resource addresses, name-to-address resolutions, DNS zone files (a DNS zone is a portion of the DNS namespace that is managed by a specific organization or administrator), and other such information. The DNS administrator 108 may also provide updated or modified DNS information to the DNS server 106.

The DNS server 106 may be configured to store, maintain, or access information about a domain structure and network addresses assigned to various network resources, such as the illustrated web server 107. For example, the DNS server 106 may be configured to communicate with a public IP address datastore 130 that contains a database of public IP addresses and their associated hostnames. The DNS server 106 may be configured to respond to requests for resource addresses (e.g., DNS requests or queries, etc.) and network addresses (e.g., public IP addresses) of network resources. That is, DNS server 106 may be configured to resolve, or translate, a hostname included in a DNS request/query to an IP address.

In some embodiments, the UE device 102 and/or the personal computer 104 may operate as DNS client computing devices, and send requests for resource addresses (e.g., DNS requests or queries, etc.) to the DNS server 106 via the communication network 110. In some embodiments, the DNS client computing devices may be configured to select a DNS server 106 from a multitude of available DNS servers.

FIGS. 1B and 1C illustrate that the communication system may include a DNS server list 152, an authoritative DNS server 154, and multiple geographically dispersed DNS servers 106 and web servers 107.

The DNS servers 154, 106 may each include a nameserver that maps domain names to IP addresses and manages the distribution of DNS records. For example, when someone types a domain name into a web browser on a DNS client 102, 104, the browser contacts a nameserver to determine the corresponding IP address for that domain, allowing the browser to access the website.

The geographically dispersed DNS servers 106 may be recursive DNS servers that make repeated queries and lookups to other DNS servers until they obtain an IP address for a domain name on behalf of the DNS client 102, 104. A recursive DNS server may also send queries to the authoritative DNS server 154, which stores a master copy of a domain's DNS records. For example, when a DNS client 102, 104 requests information about a domain, the request is sent to a recursive DNS server that performs the necessary lookups and returns the result. If the recursive DNS server does not have the information in its cache, it may query the authoritative DNS server 154 for the domain. The authoritative DNS server 154 may then return the requested information to the recursive server, which may send it to the DNS client 102, 104.

In some embodiments, the authoritative DNS server 154 may be configured to provide tailored responses to specific recursive name servers servicing clients in specific time zones. Additional attributes may be added to address records in authoritative nameserver configuration, enabling categorization of known recursive nameservers (e.g., DNS servers 106a, 106b, 106c) and responses to those nameservers based upon their categorization.

Each of the DNS servers 106a, 106b, 106c may be configured to provide a tailored response obtained from the authoritative name server or geographical responses that are unique or different than the responses from any of the other DNS servers 106a, 106b, 106c. The DNS servers 106a, 106b, 106c may be configured to point to resources in one specific time zone (e.g., one of web servers 107a, 107b, 107c, etc.) and/or to prioritize resources in one particular time zone.

The web servers 107a, 107b, 107c may be synchronized and/or coupled to a centralized shared database or a geographically redundant synchronized database 109, which may include any or all of the databases discussed in this application (e.g., the public IP address datastore 130, etc.). As such, each of the web servers 107a, 107b, 107c may pull from the same set of information that is dispersed geographically and/or stored in different geographic locations. This allows DNS client computing devices to access the same information regardless of the local web server 107a, 107b, 107c to which it connects.

By using a local web server 107a, 107b, 107c, reductions in latency may be achieved. In addition, the performance and responsiveness of UE devices may be improved. For example, a DNS client computing device that is geo-located in New York may receive a response from the New York local web server 107a in 10 milliseconds, whereas the same response from a more distant web server (e.g., 107b or 107c) may take 20-30 milliseconds or longer.

Figure 2:
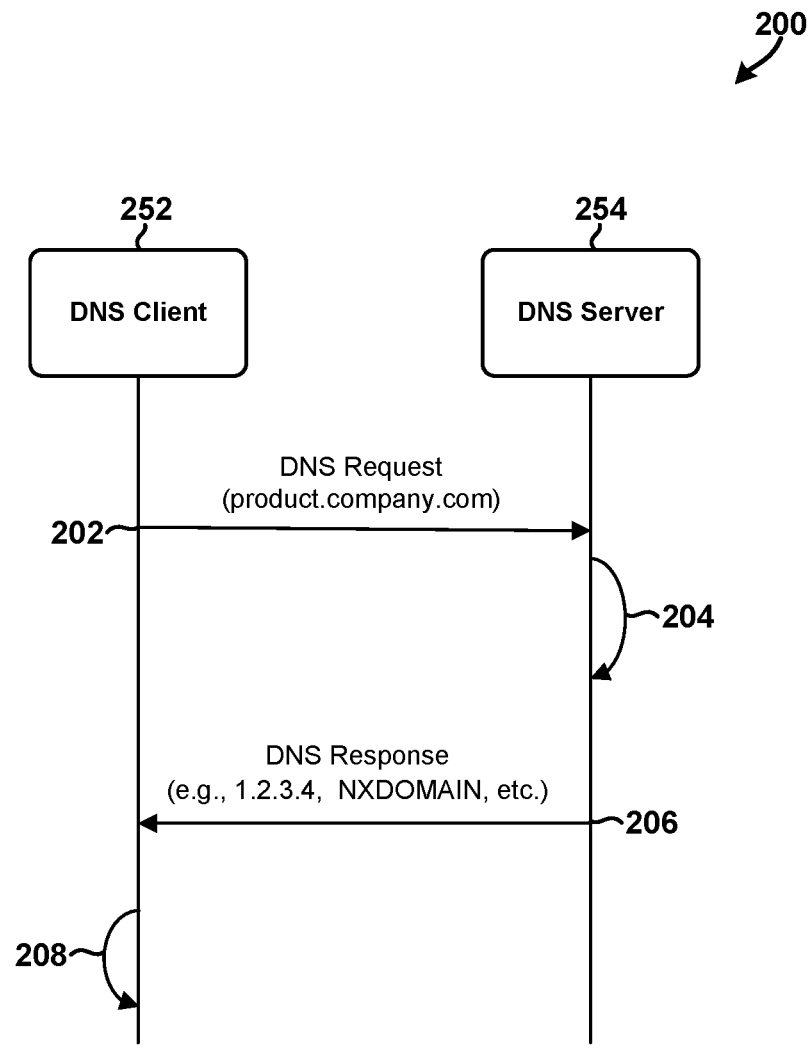
FIG. 2 is a message flow diagram illustrating components and interactions in a DNS system configured to translate domain names to numerical addresses in accordance to some embodiments.

FIG. 2 illustrates example components and operations in a system 200 configured to use DNS to resolve addresses in accordance with some embodiments. System 200 includes a DNS client 252 computing device (e.g., UE device 102, laptop computer 104, etc.) and a DNS server 254 computing device (e.g., DNS server 106, etc.).

In operation 202, the DNS server 254 may receive a DNS request for a resource address (e.g., hostname, etc.) from a DNS client 252. For example, the DNS server 254 receive a DNS request that includes the hostname or fully qualified domain name (FQDN) "product.company.com" in operation 202.

In operation 204, the DNS server 254 may query a datastore that includes DNS zone files, tables, database records, or other similar data or information structures that associate hostnames or FQDNs with IP addresses. If the query results include a resource address, the DNS server 254 may generate a DNS response message that includes the resource address. In instances in which the query results do not include a resource address (or otherwise indicate that the datastore does not include a valid resource address for the requested resource), the DNS server 254 may generate the DNS response message to include an indication that the DNS server 254 was unable to determine the requested resource address. For example, the DNS server 254 may generate the DNS response message with a non-existent domain indication (e.g., NXDOMAIN).

In operation 206, the DNS server 254 may send the DNS response message to the DNS client 252. In operation 208, the DNS client 252 may receive the DNS response message, and determine whether the DNS response message includes a resource address (e.g., 10.1.1.5, etc.) or an error indication (e.g., NXDOMAIN, etc.). If the DNS response message includes a resource address, the DNS client 252 may use the resource address to access the requested resource (e.g., by directing a browser to navigate to 10.1.1.5, etc.). In instances in which the DNS response message includes an error indication (e.g., NXDOMAIN, etc.), the DNS client 252 may notify the user that the hostname or FQDN is not valid or that the requested site is not available.

The web server and/or the DNS server 254 to which the DNS client 252 connects may be predetermined or selected based on the geographic location of the home network of the DNS client 252. As such, the DNS client 252 may continue to connect to the same DNS server 254 even in instances in which the DNS client 252 has moved to another geographic location (e.g., a person in New York gets on a plane and flies to California, etc.). This may increase latency, congestion and/or otherwise have a user-perceivable negative impact on the performance of the DNS client 252. Various embodiments disclosed herein may overcome these and other technical challenges by deploying a network of local web servers and configuring the DNS client 252 to perform client-side DNS prioritization in which the DNS client 252 determines and selects the DNS server 254 (and the web server) based on the current time zone of the DNS client 252.

Figure 3:
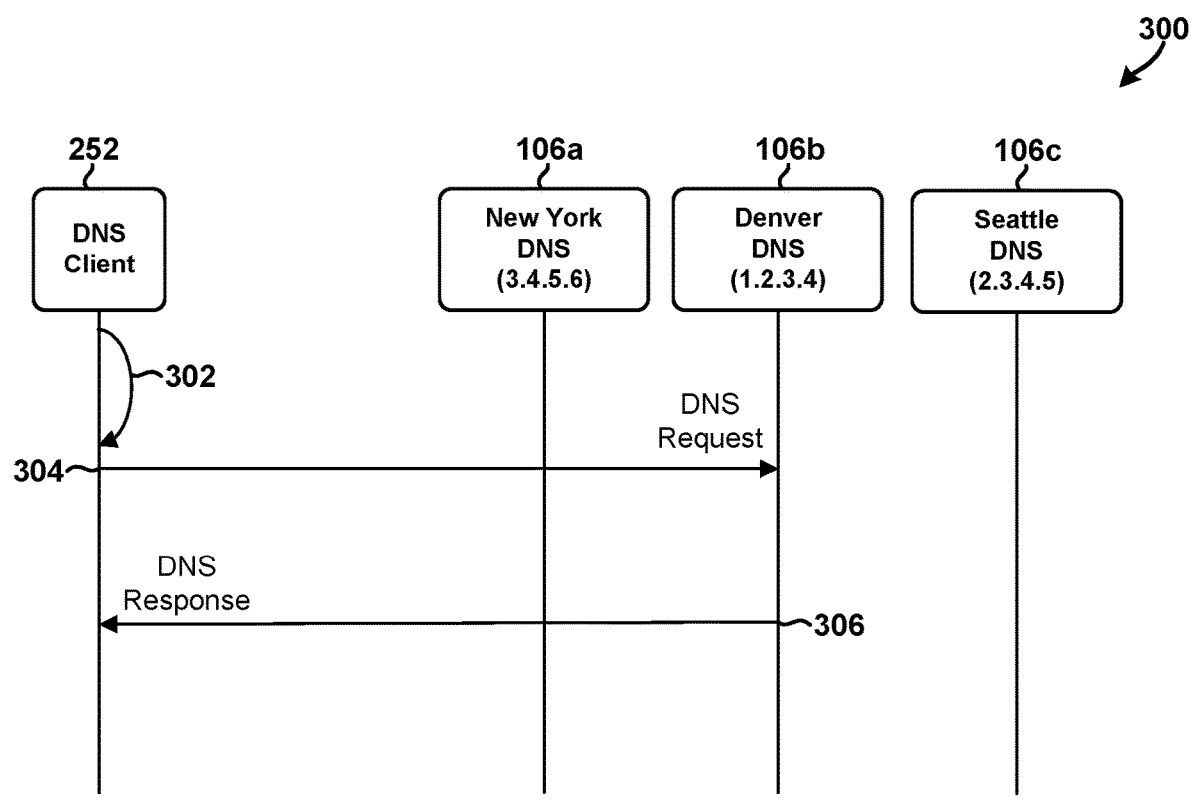
FIG. 3 is a message flow diagram illustrating components and interactions in a system configured to implement a method of client-side DNS prioritization that uses a time zone offset to select from configured list of DNS servers in accordance with some embodiments.

FIG. 3 illustrates example components and operations in a system 300 configured to implement a method of client-side DNS prioritization that uses a time zone offset to select from configured list of DNS servers in accordance with some embodiments. In the example illustrated in FIG. 3, the system 300 includes a DNS client 252 computing device (e.g., UE device 102, laptop computer 104, etc.) and multiple geographically dispersed DNS servers 106a, 106b, 106c. The DNS servers 106a, 106b, 106c may be configured to provide tailored responses obtained from the authoritative name server, and which are geographically optimal and differing responses from other regions in support of the DNS client 252. The DNS client 252 may intelligently select to communicate with a specific DNS server 106a, 106b, 106c based on its current time zone.

In operation 302, the DNS client 252 may determine a current time zone based on the location of the DNS client 252, query the DNS server list, and select a DNS server based on the results of the query. For example, the DNS client 252 may receive a time zone offset from a network dynamically, or the time zone may be configured statically by the end user. The DNS client 252 may then use the time zone offset to select a DNS server (e.g., 106a, 106b, or 106c). In the example illustrated in FIG. 3, the DNS client 252 selects the Denver DNS server 106b.

In operation 304, the DNS client 252 may send a DNS request for a resource address (e.g., hostname, etc.) to the selected DNS server 106b. For example, the DNS client 252 may send a DNS request that includes the hostname or FQDN "product.company.com" in operation 204. The DNS server 106b may be configured to respond with records prioritized in such a way that the highest priority resources that are most optimal for devices located in the time zone are assigned to the DNS client 252.

In operation 306, the DNS client 252 may receive a DNS response message that includes a tailored response obtained from the authoritative name server and/or which priorities resource addresses based on their geographic proximity to the current time zone of the DNS client 252. For example, the DNS client 252 may receive DNS response message that includes a resource address from the Denver DNS server 106b. The DNS client 252 may use the resource address to access geographically optimized resources (e.g., by directing a browser to navigate a Denver web server at address 1.2.3.5, etc.).

Figure 4A:
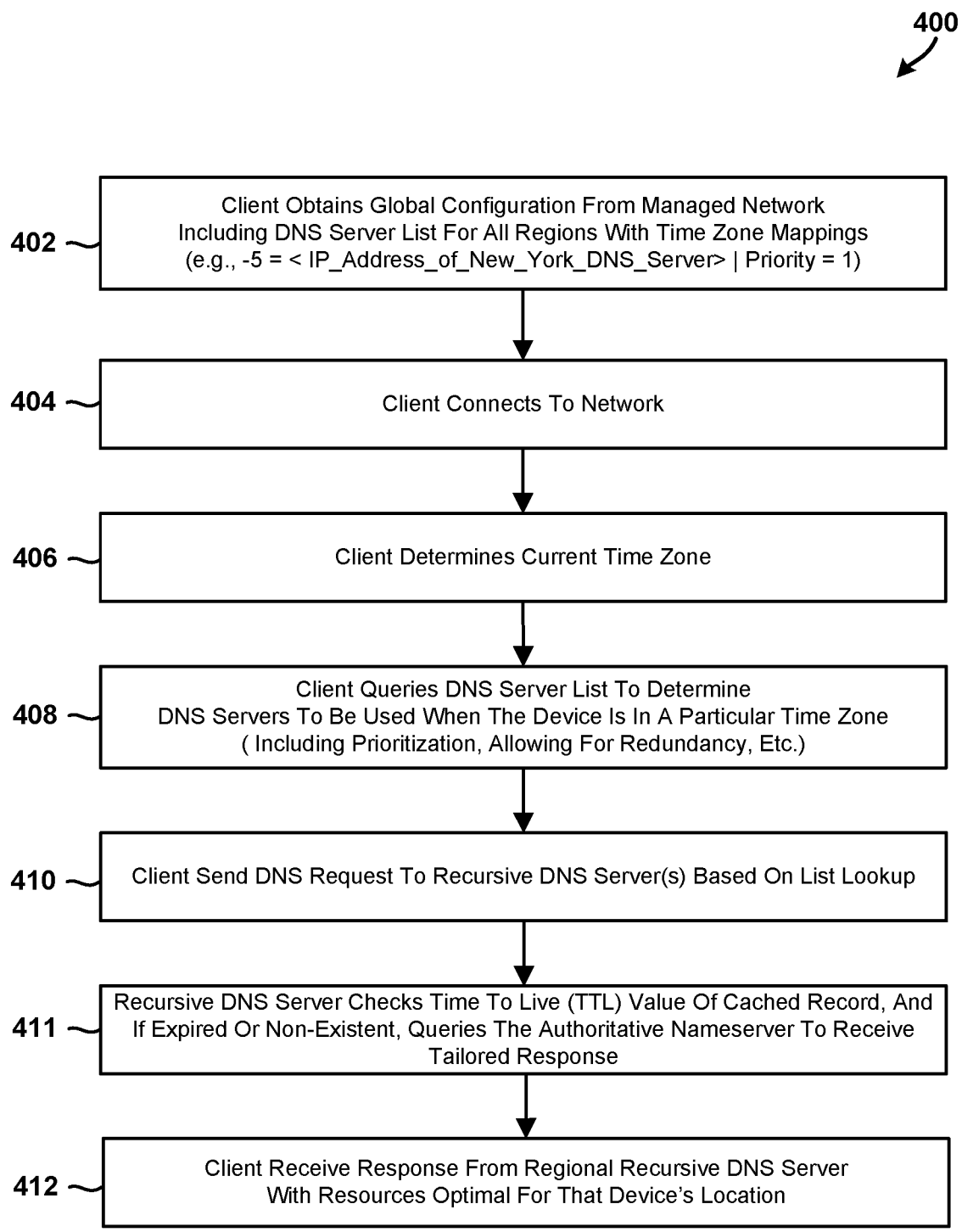
FIGS. 4A and 4B are process flow diagrams that illustrate methods of performing client-side DNS prioritization in accordance with some embodiments.
Figure 4B:
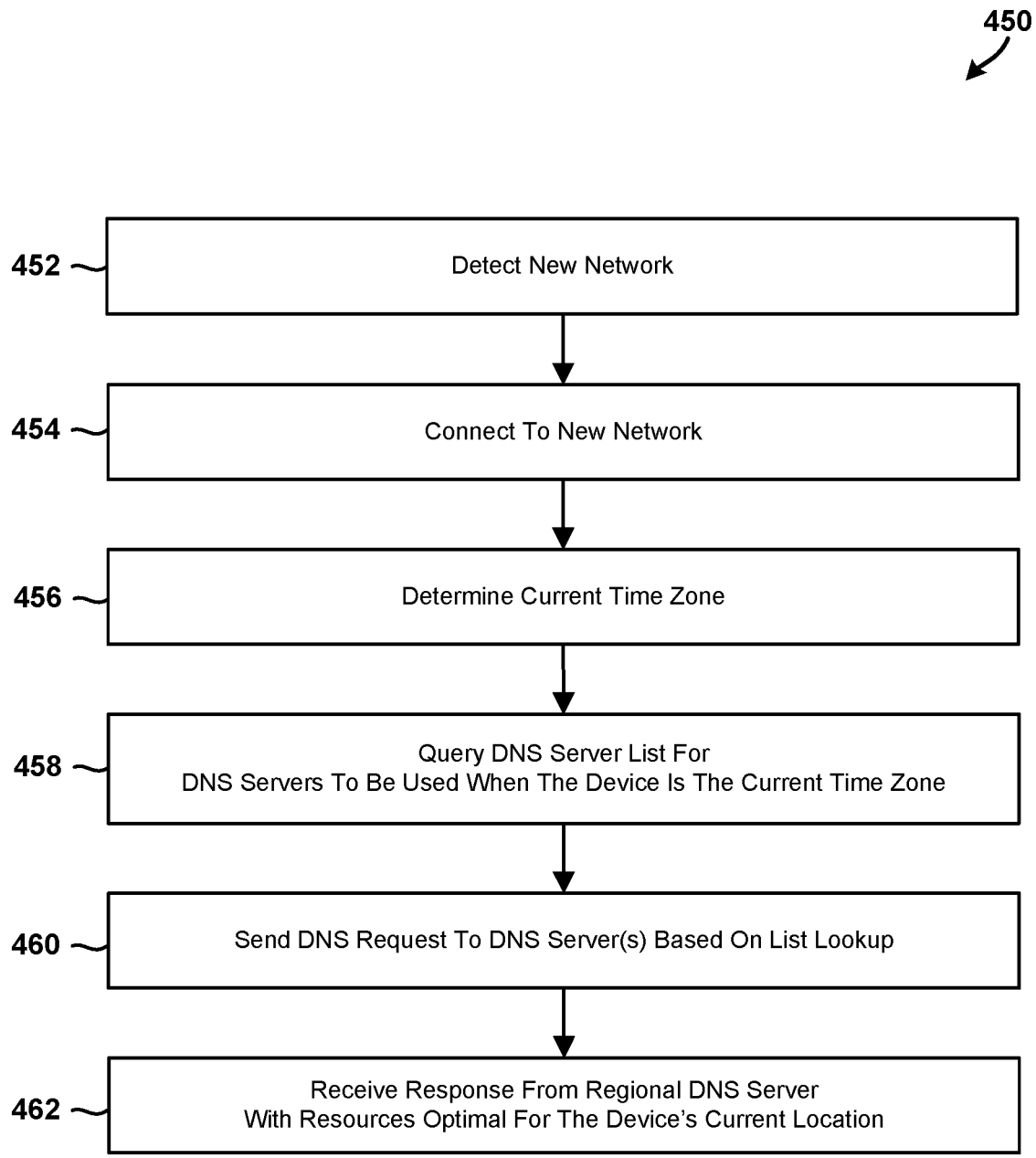

FIGS. 4A and 4B illustrate methods 400, 450 of performing client-side DNS prioritization in accordance with some embodiments. Methods 400, 450 may be performed by a processor in a DNS client 252 computing device (e.g., UE device 102, laptop computer 104, etc.).

With reference to FIG. 4A, in block 402, the DNS client 252 may obtain global configuration from managed network including DNS server list for all regions with time zone mappings (e.g., −5=<IP_Address_of_New_York_DNS_Server>|Priority=1). That is, the DNS client may obtain global configuration information that includes a list of DNS servers for various regions and their respective time zones. The list of DNS servers may include the IP addresses of the DNS servers and their associated priority value. The priority may be used to determine the order in which the DNS client queries the servers. In the above example, the New York DNS server is the first server that the DNS client will query.

By having a list of DNS servers for different regions, the DNS client 252 may ensure that it always communicates with the closest, fastest, and most reliable DNS server. This helps to improve the overall speed and reliability of the internet connection. Additionally, the time zone mappings ensure that the DNS client may accurately determine the time zone in which a request originates. This is particularly important for time-sensitive applications and services.

In block 404, the DNS client 252 may connect to a network, which may or may not be managed by the service provider. In block 406, the DNS client 252 may determine its current time zone. For example, the DNS client 252 may receive a time zone offset (e.g., −5) from a network dynamically. Alternatively, the time zone may be configured statically in the DNS client 252 by the end user.

In block 408, the DNS client 252 may query a DNS server list (e.g., DNS server list 152 illustrated in FIG. 1B) to determine the DNS servers to be used when the DNS client 252 is geo-located in a particular time zone (including prioritization, allowing for redundancy, etc.). In block 410, the DNS client 252 may select a regional DNS server (e.g., DNS servers 106a, 106b, or 106c) based on the results of the querying DNS server list, and send a DNS request to the selected DNS server.

In block 412, the DNS client 252 may receive a response from the regional DNS server with resources prioritized based on the DNS client's time zone or location.

With reference to FIG. 4B, in block 452, the DNS client 252 may lose connectivity to its previous network and/or detect a new network. In block 454, the DNS client 252 may connect to the new network. In response to detecting and/or connecting to the new network, the DNS client 252 may determine and/or update its current time zone in block 456. In block 458, the DNS client 252 may reference the DNS server list for DNS servers to be used when the device is the current time zone.

In block 460, the DNS client 252 may select a new regional DNS server (e.g., DNS servers 106a, 106b, or 106c) based on the results of the querying DNS server list, and send a DNS request to the selected new DNS server. In block 462, the DNS client 252 may receive a response from a new regional DNS server with resources that optimal for the DNS client's new time zone or location.

Figure 5:
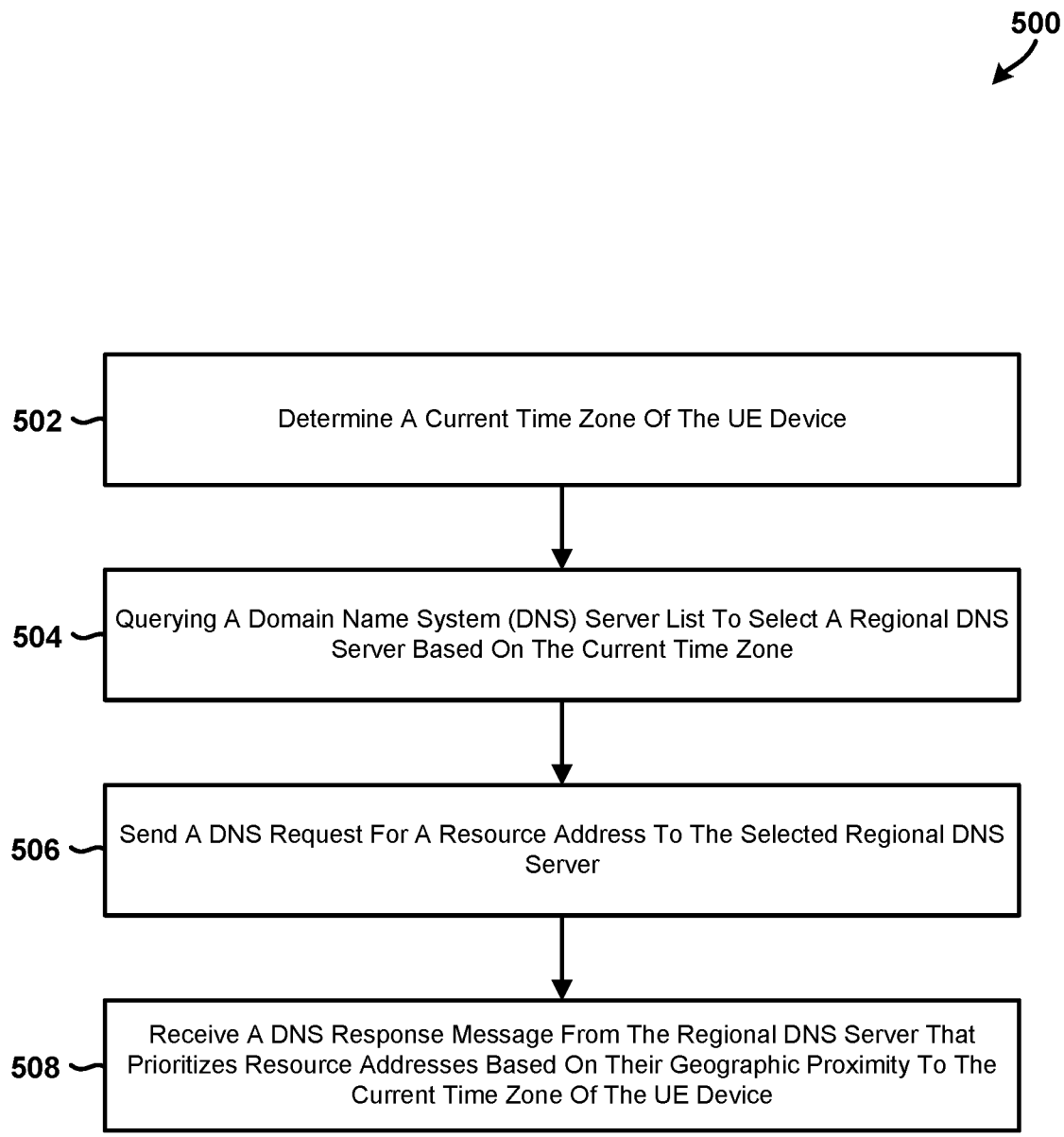
FIG. 5 is a process flow diagram that illustrates a method of requesting resources in a communication network in accordance with some embodiments.

FIG. 5 illustrates a method 500 of requesting resources in a communication network in accordance with some embodiments. Method 500 may be performed by a processor in a DNS client 252 computing device (e.g., UE device 102, laptop computer 104, etc.). In block 502, the processor may determine a current time zone of the UE device. In some embodiments, the processor may dynamically receive a time zone offset from the communication network, and determine its current time zone based on the time zone offset. In some embodiments, the processor may access a statically configured time zone value stored on the UE device, and determine its current time zone based on the statically configured time zone value. In some embodiments, the processor may select a DNS IP address based on the time zone defined or determined in the UE device.

In block 504, the processor may query a domain name system (DNS) server list to select a regional DNS server based on the current time zone. As part of these operations, the processor may perform the operations discussed above with reference to FIGS. 3-4B (e.g., with reference to blocks 302, 408, 458, etc.). In block 506, the processor may send a DNS request for a resource address to the selected regional DNS server. In some embodiments, sending the DNS request in block 506 may include causing an authoritative DNS to provide regionally tailored responses to specific recursive DNS servers servicing clients in specific time zones. In block 508, the processor may receive a DNS response message from the regional DNS server that prioritizes resource addresses based on their geographic proximity to the current time zone of the UE device. As part of the operations in block 508, the processor may perform the operations discussed above with reference to FIGS. 3-4B (e.g., with reference to blocks 306, 412, 462, etc.).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 450 may be substituted for or combined with one or more operations of the methods 400, 450, and vice versa.

Some various embodiments (including, but not limited to, embodiments discussed above with reference to FIGS. 1-6) may be implemented in any of a variety of UE computing devices, an example of which is illustrated in FIG. 6. For example, the computing device 600 may include a processor 601 coupled to a controller 604 and an internal memory 602. The processor 601 may be one or more multicore integrated circuits (ICs) designated for general or specific processing tasks. The internal memory 602 may be volatile or non-volatile memory, and may also be secure and/or encrypted memory, or unsecure and/or unencrypted memory, or any combination thereof.

Figure 6:
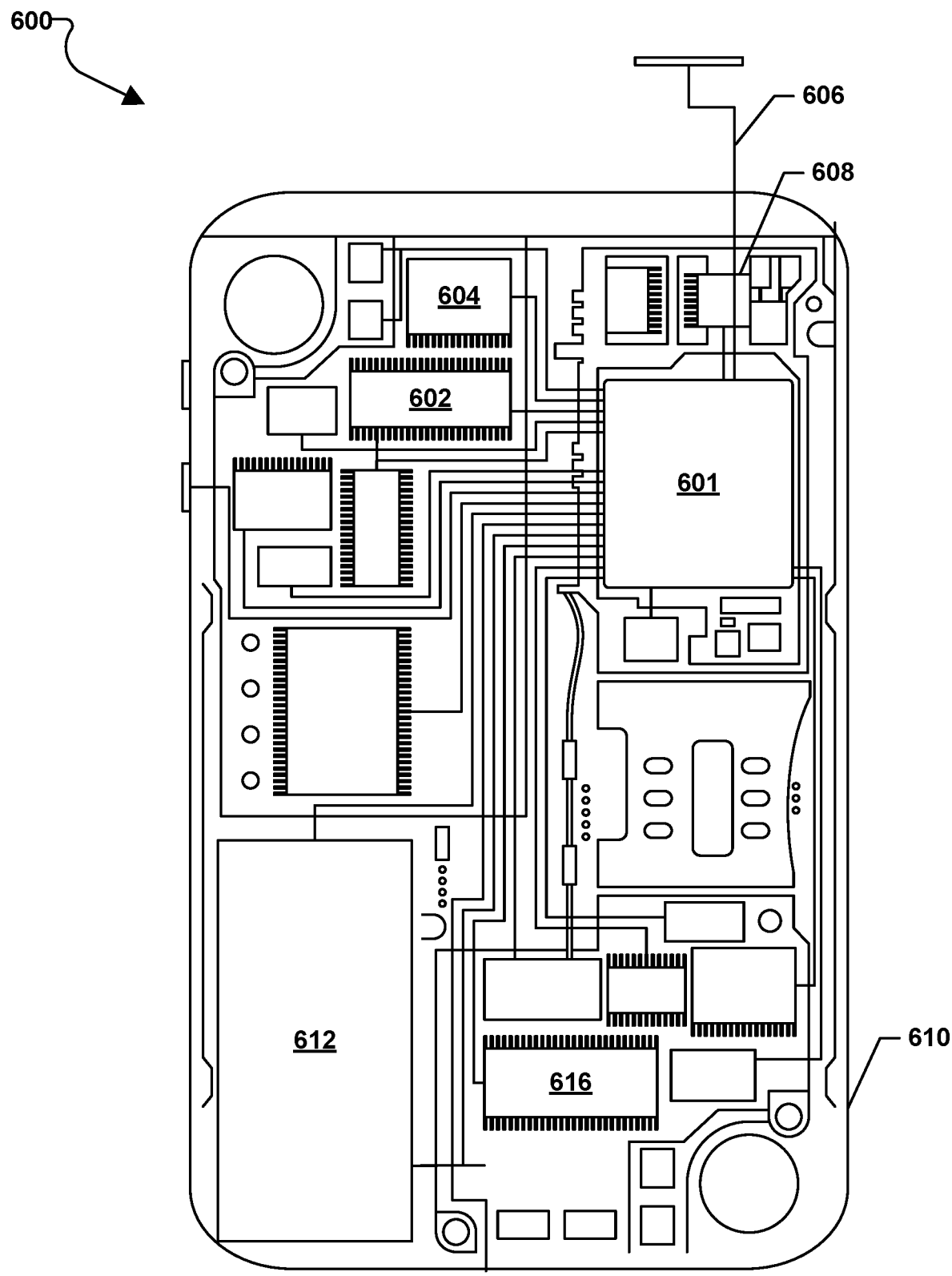
FIG. 6 is a block diagram of a communication device suitable for implementing any of the embodiments.

With reference to FIG. 6, the UE computing device 600 may have one or more radio signal transceivers 608 (e.g., Peanut®, Bluetooth®, ZigBee®, Wi-Fi, cellular, etc.) and antennae 606, for sending and receiving, coupled to each other and/or to the processor 601. The transceivers 608 and antennae 606 may be used with the above-mentioned circuitry to implement the various wireless transmission protocol stacks and interfaces. The computing device 600 may include a cellular network wireless modem chip 616 that enables communication via a cellular network and is coupled to the processor.

The UE computing device 600 may also include a housing 610, constructed of a plastic, metal, or a combination of materials, for containing all or some of the components discussed herein. The computing device 600 may include a power source 612 coupled to the processor 601, such as a disposable or rechargeable battery. The rechargeable battery may also be coupled to the peripheral device connection port to receive a charging current from a source external to the computing device 600.

Figure 7:
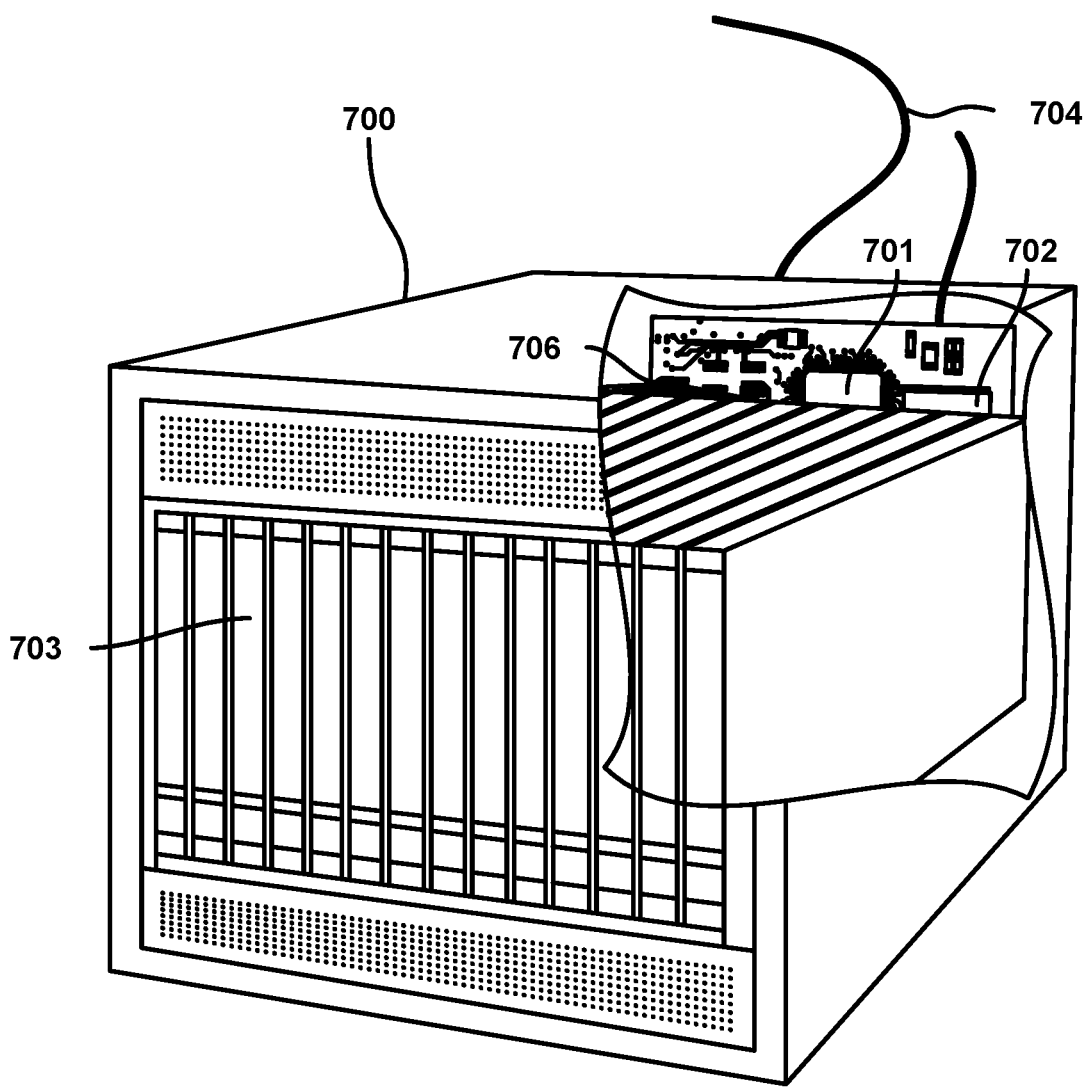
FIG. 7 is a component diagram of an example server suitable for implementing the various embodiments.

Some embodiments (e.g., regional DNS servers, etc.) may be implemented on any of a variety of commercially available computing devices, such as the server computing device 700 illustrated in FIG. 7. Such a server device 700 may include a processor 701 coupled to volatile memory 702 and a large capacity nonvolatile memory, such as a disk drive 703. The server device 700 may also include a floppy disc drive, USB, compact disc (CD) or DVD disc drive coupled to the processor 701. The server device 700 may also include network access ports 706 coupled to the processor 701 for establishing data connections with a network connection circuit 704 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of requesting resources in a communication network, comprising:
   determining, by a processor in a user equipment (UE) device, a current time zone of the UE device;
   querying a locally stored domain name system (DNS) server list to select a regional DNS server based on the current time zone, wherein the DNS server list comprises a list of DNS servers for various regions and their respective time zones;
   sending a DNS request for a resource address to the selected regional DNS server; and
   receiving a DNS response message from the regional DNS server that prioritizes resource addresses based on their geographic proximity to the current time zone of the UE device.

2. The method of claim 1, wherein determining the current time zone of the UE device comprises dynamically receiving a time zone offset from the communication network.

3. The method of claim 1, wherein determining the current time zone of the UE device comprises accessing a statically configured time zone value stored on the UE device.

4. The method of claim 1, further comprising selecting, by the processor in the UE device, a DNS internet protocol (IP) address based on the time zone defined or determined in the UE device.

5. The method of claim 1, wherein sending a DNS request for a resource address to the selected regional DNS server comprises causing an authoritative DNS to provide regionally tailored responses to specific recursive DNS servers servicing clients in specific time zones.

6. A user equipment (UE) device, comprising:
   a memory having locally stored thereon a domain name system (DNS) server list comprising a list of DNS servers for various regions and their respective time zones;
   a processor coupled to the memory, wherein the processor is configured to:
      determine a current time zone of the UE device;
      query the DNS server list to select a regional DNS server based on the current time zone;
      send a DNS request for a resource address to the selected regional DNS server; and
      receive a DNS response message from the regional DNS server that prioritizes resource addresses based on their geographic proximity to the current time zone of the UE device.

7. The UE device of claim 6, wherein the processor is configured to determine the current time zone of the UE device by dynamically receiving a time zone offset from the communication network.

8. The UE device of claim 6, wherein the processor is configured to determine the current time zone of the UE device by accessing a statically configured time zone value stored on the UE device.

9. The UE device of claim 6, wherein the processor is further configured to select a DNS internet protocol (IP) address based on the time zone defined or determined in the UE device.

10. The UE device of claim 6, wherein the processor is configured to send the DNS request for the resource address to the selected regional DNS server to cause an authoritative DNS to provide regionally tailored responses to specific recursive DNS servers servicing clients in specific time zones.

11. A non-transitory processor-readable medium having stored thereon processor-readable instructions configured to cause a processor in a user equipment (UE) device to perform operations for requesting resources in a communication network, the operations comprising:
   determining a current time zone of the UE device;
   querying a locally stored domain name system (DNS) server list to select a regional DNS server based on the current time zone, wherein the DNS server list comprises a list of DNS servers for various regions and their respective time zones;
   sending a DNS request for a resource address to the selected regional DNS server; and
   receiving a DNS response message from the regional DNS server that prioritizes resource addresses based on their geographic proximity to the current time zone of the UE device.

12. The non-transitory processor-readable medium of claim 11, wherein determining the current time zone of the UE device comprises dynamically receiving a time zone offset from the communication network.

13. The non-transitory processor-readable medium of claim 11, wherein determining the current time zone of the UE device comprises accessing a statically configured time zone value stored on the UE device.

14. The non-transitory processor-readable medium of claim 11, further comprising selecting a DNS internet protocol (IP) address based on the time zone defined or determined in the UE device.

15. The non-transitory processor-readable medium of claim 11, wherein sending a DNS request for a resource address to the selected regional DNS server comprises causing an authoritative DNS to provide regionally tailored responses to specific recursive DNS servers servicing clients in specific time zones.

16. A user equipment (UE) device, comprising:
   means for storing locally a domain name system (DNS) server list comprising a list of DNS servers for various regions and their respective time zones;
   means for determining a current time zone of the UE device;
   means for querying the DNS server list to select a regional DNS server based on the current time zone;
   means for sending a DNS request for a resource address to the selected regional DNS server; and
   means for receiving a DNS response message from the regional DNS server that prioritizes resource addresses based on their geographic proximity to the current time zone of the UE device.

17. The UE device of claim 16, wherein means for determining the current time zone of the UE device comprises means for dynamically receiving a time zone offset from the communication network.

18. The UE device of claim 16, wherein means for determining the current time zone of the UE device comprises means for accessing a statically configured time zone value stored on the UE device.

19. The UE device of claim 16, further comprising means for selecting a DNS internet protocol (IP) address based on the time zone defined or determined in the UE device.

20. The UE device of claim 16, wherein means for sending a DNS request for a resource address to the selected regional DNS server comprises means for causing an authoritative DNS to provide regionally tailored responses to specific recursive DNS servers servicing clients in specific time zones.

\* \* \* \* \*